US011007919B2

(12) United States Patent
Nash (10) Patent No.: US 11,007,919 B2
(45) Date of Patent: *May 18, 2021

(54) PIVOTING SYSTEM AND METHOD FOR AN ELECTRICAL DEVICE OF A HITCH-ATTACHED PLATFORM

(71) Applicant: Harmar Mobility, LLC, Sarasota, FL (US)

(72) Inventor: Derek J. Nash, Bradenton, FL (US)

(73) Assignee: Harmar Mobility, LLC, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,852

(22) Filed: Oct. 28, 2019

(65) Prior Publication Data

US 2020/0148086 A1 May 14, 2020

Related U.S. Application Data

(63) Continuation of application No. 15/808,400, filed on Nov. 9, 2017, now Pat. No. 10,457,187.

(60) Provisional application No. 62/420,201, filed on Nov. 10, 2016.

(51) Int. Cl.
*B60P 1/44* (2006.01)
*A61G 3/06* (2006.01)
*B60R 9/06* (2006.01)

(52) U.S. Cl.
CPC ............ *B60P 1/4464* (2013.01); *A61G 3/062* (2013.01); *B60P 1/4428* (2013.01); *B60P 1/4485* (2013.01); *B60R 9/06* (2013.01); *Y10S 414/134* (2013.01)

(58) Field of Classification Search
CPC ..... B60R 9/06; B60R 9/10; B60P 3/07; B60P 3/122; B60P 1/4485; B60P 1/4421; A61G 3/0209; B60Q 1/2657; B60Q 1/305; B60Q 7/02; Y10S 224/924; Y10S 414/134; B65G 69/26
USPC ........ 224/502, 504, 584; 340/468, 479, 487, 340/488, 489; 40/612; 414/462, 546, 414/549, 556, 921
See application file for complete search history.

(56) References Cited

U.S. PATENT DOCUMENTS

| 2,671,212 | A | * | 3/1954 | Mingle | .................... | B60Q 7/00 |
| | | | | | | 340/473 |
| 4,072,257 | A | * | 2/1978 | Hall | ......................... | B60R 9/06 |
| | | | | | | 200/61.59 |
| 4,851,970 | A | | 7/1989 | Bronder | | |
| 5,092,503 | A | * | 3/1992 | Cocks | ....................... | B60R 9/06 |
| | | | | | | 224/508 |

(Continued)

OTHER PUBLICATIONS

Mar. 4, 2019—U.S. Non-Final Office Action—U.S. Appl. No. 15/808,400.

*Primary Examiner* — Gregory W Adams
(74) *Attorney, Agent, or Firm* — Banner & Witcoff, Ltd.

(57) ABSTRACT

A pivoting system has an electronic device pivotably mounted on a cargo platform. A base is coupled to a cargo support. A linkage rod slidably engages with the cargo platform. A proximal pivot pivotably couples the proximal end of the linkage rod arm to the base. A device pivot pivotably couples the electronic device to the cargo platform. A distal pivot pivotably couples the distal end of the linkage rod to the electronic device. The pivoting system causes pivoting of the electronic device between a lower general horizontal position and an upper general horizontal position.

20 Claims, 12 Drawing Sheets

(56) References Cited

U.S. PATENT DOCUMENTS

| | | | | |
|---|---|---|---|---|
| 5,662,256 A | * | 9/1997 | Bryan | B62H 3/02 224/523 |
| 6,206,259 B1 | * | 3/2001 | Brungardt | B60R 9/06 224/497 |
| 6,783,315 B1 | | 8/2004 | Senechal | |
| 6,799,873 B2 | | 10/2004 | Fox | |
| 6,886,968 B1 | | 5/2005 | Hamelink et al. | |
| 7,527,440 B1 | * | 5/2009 | White | G03B 17/00 315/82 |
| 7,834,750 B1 | | 11/2010 | Hertz et al. | |
| 8,132,997 B2 | * | 3/2012 | Reuille | B60P 1/4421 414/462 |
| 8,552,852 B1 | | 10/2013 | Hertz et al. | |
| 8,985,933 B2 | * | 3/2015 | Ziaylek | A62C 27/00 414/462 |
| 9,291,324 B2 | | 3/2016 | Huebner et al. | |
| 9,849,830 B1 | | 12/2017 | Salter et al. | |
| 10,457,187 B1 | * | 10/2019 | Nash | B60R 9/06 |
| 2005/0274759 A1 | | 12/2005 | Kircher | |
| 2011/0090072 A1 | | 4/2011 | Haldeman | |
| 2014/0022067 A1 | | 1/2014 | Dambra | |
| 2015/0047132 A1 | | 2/2015 | Sveum et al. | |
| 2015/0048934 A1 | * | 2/2015 | Loce | G08G 1/166 340/435 |

\* cited by examiner

PIVOTING SYSTEM AND METHOD FOR AN ELECTRICAL DEVICE OF A HITCH-ATTACHED PLATFORM

CROSS-REFERENCE TO RELATED APPLICATIONS

This application is a continuation of U.S. patent application Ser. No. 15/808,400, filed Nov. 9, 2017, entitled Pivoting System and Method for an Electrical Device, which claims priority to U.S. Provisional Application No. 62/420,201, filed Nov. 10, 2016, all of which are herein incorporated by reference in their entirety.

FIELD OF THE INVENTION

This invention relates to a pivoting system and more particularly to an improved pivoting system for a device mounted on a cargo platform.

DESCRIPTION OF THE RELATED ART

The prior art has known various types of devices and methods for pivoting a device. The various types of devices and methods of the prior art for pivoting a device on a structure included a diverse and variety of apparatuses and methods adapted for many as specific applications and uses. The following U.S. Patents are representative of the attempts of the prior art to provide apparatuses and devices for pivoting a device on a structure.

U.S. Pat. No. 5,033,705 to Reagan discloses a camera/device support platform with improved structure for positioning the camera/device in multiple positions and about multiple axes. The camera/device is supported and counterbalanced in such a manner so as to maintain the mounting platform in a fixed attitude that is typically parallel to the ground. The camera/device, while so supported, can be freely repositioned closer to or farther from the photographed object, in addition to swinging in a vertical arc or a horizontal arc, without the need to move the support platform.

U.S. Pat. No. 7,341,264 to Swannie discloses a trailer hitch-mounted reverse sensing device for a vehicle for indicating to the driver an object behind the vehicle comprises a housing with an extension extending from the housing. The extension is configured to be removably received within a receiver of a towing hitch. The housing includes a front face having a central portion, and first and second end portions. The first and second portions are angled such that a line transverse to either the first or second end portions is directed toward the centerline of the vehicle between the front and rear of the vehicle. First and second sensors are disposed in respective first and second end portions and directed toward the rear of the vehicle along the transverse line. A control module is disposed within the housing and operably connected to the sensors to determine the distance of the object sensed by the sensors. An indicator is operably connected to the control module and activated by the control module to provide an indication of distance to the object sensed by the sensors at the rear of the vehicle.

U.S. Pat. No. 8,902,052 to Dambra discloses a hitch mounted lift platform includes platform and lift base back-up sensors for detecting and alerting a vehicle occupant of a rear obstruction being approached to prevent collision and damage to the Ii-ft platform1, items carried on the lift and the rear obstruction. The lift platform includes quick disconnect devices for connecting and disconnecting the associated wiring for easy attachment and detachment of the lift platform from the vehicle. The back-up sensors communicate with a visual display and/or speakers for visually and audibly alerting the vehicle occupant of any approaching rear obstructions. In operation, the visual display is activated when the vehicle is put in reverse. An audible alerting noise, such as beeping, is initiated by the back-up sensors detecting the vehicle is coming within a predetermined distance of an obstruction.

U.S. Pat. No. 9,264,588 to Barthel discloses a theft protection device for a camera unit that is arranged on a movable protection element of a motor vehicle, said camera unit being used to detect images of the outer area. The protection element can be moved between a closed position and an open position. In the closed position, the camera unit is in the idle position and in the open position, the camera unit is in the operational position. The protection element comprises a receiving unit for the camera unit on the inner side, the side of the protection element facing away from the outer area, a safety element being arranged on the receiving element which safety element reliably maintains the camera unit in the receiving element. At least one securing means secures the safety element to the inner side of the protection element, and the securing means is arranged at such a distance from the protection element that the securing means cannot be tampered with when the protection element is in the open position.

U.S. Patent Application 2003/0076480 to Burbulla discloses a camera crane having a carriage, a crane post which is arranged above the carriage, and a boom which is attached in such a manner that the boom can be tilted about a crane pivot axis, with sections of the boom extending on either side of the crane pivot axis. At an end of one section of the boom, a camera can be attached, and on the other section, a moment compensating counterweight can be attached. The section of the boom which carries the counterweight has a smaller length than the length of the crane post between carriage and crane pivot axis, and the boom has a pivot range about the crane pivot axis of more than 180 degrees.

U.S. Patent Application 2007/0182820 to Wang discloses a sensor or camera system that can be readily mounted to the existing hitch socket of an automobile such as an SUV, minivan or RV. The system also can use the existing hitch wiring for its power source. The sensor or camera system can fit into any automotive hitch system, whether the hitch is factory-installed or after-market. The installed sensor, camera, or illuminating devices can be easily secured or locked by a hitch pin or hitch locking pin. For simplicity, the overall system will be generally referred to, in the following description. It should be apparent to those skilled in the art that the detection system may include sensors, cameras or both.

U.S. Patent Application 2007/0216136 to Dietz discloses a system for facilitating the backing of a vehicle to couple a hitch and trailer, the system including a camera and a mirror for allowing capture of visual images of both the approaching vehicle and the trailer tongue, to assist in backing the vehicle and making the coupling.

U.S. Patent Application 2010/0040361 to Schuetz discloses a device for a motor vehicle, comprising a rotatably mounted camera unit which can be brought into an inactive position and into an active position by means of a motor, and a protective element that can be rotatably guided about a first axis into a closed position and into an open position, the camera unit, in the closed position, being in its inactive position behind the protective element and inaccessible from the exterior, and, in the open position of the protective element, the camera unit assuming the active position for recording images. The invention is characterized in that the camera unit can be displaced from the inactive position into the active position about a second axis, arranged at a distance to the first axis, the protective element is connected to the first axis via a swivel arm, and the motor drives a mechanism, mow1ted on the motor vehicle, which is mechanically connected both to the protective element and to the camera unit. The mechanism is configured in such a manner that the camera unit is decoupled from the mechanism when it is in the operating state and that the protective element can be displaced from the closed position to the open position, the camera unit remaining in the inactive position.

U.S. Patent Application 2010/0073478 to Kalous discloses a trailer hitch mountable device for installation in a trailer hitch receiver tube includes a housing and a retainer bracket. The housing is sized to be received in the receiver tube and has an outermost wall including at least a first arcuate portion sized to align with circumferential edges of aligned mounting holes of the receiver tube when the device is installed in the receiver tube. The retainer bracket is secured to the housing and configured to engage an outermost edge of the receiver tube when the device is installed in the receiver tube. When the device is installed in the receiver tube and a receiver pin is inserted through the aligned mounting holes, the first arcuate portion prevents movement of the housing toward the outermost edge of the receiver tube, and the retainer bracket prevents movement of the housing away from the outermost edge of the receiver tube.

Although the aforementioned prior art have contributed to the development of the art of pivoting systems for a device, none of these prior art patents have solved the needs of this art.

Therefore, it is an object of this invention an improved pivoting system for a device mounted on a structure.

Another object of this invention is to provide an improved pivoting system that pivots an electronic device between a lower horizontal position to a upper horizontal position concurrently with the pivoting of a cargo platform between a horizontal position to a vertical position respectively.

Another object of this invention is to provide an improved pivoting system that is adjustable for positioning the device.

Another object of this invention is to provide an improved pivoting system that pivots a proximity sensor.

Another object of this invention is to provide an improved pivoting system that pivots a camera.

Another object of this invention is to provide an improved pivoting system that is easy to install with a cargo platform.

Another object of this invention is to provide an improved pivoting system that is cost effective to produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a pivoting system for a device mounted on a cargo platform. A cargo pivot pivotably couples the cargo platform with a cargo support. The cargo support is coupled to a structure. The cargo pivot pivotably couples the cargo platform between a general vertical position and a general horizontal position. The pivoting system comprises a base coupled to the cargo support. A frame is coupled to the cargo platform. A linkage rod extends between a proximal end and a distal end and slidably engages with the cargo platform. A proximal pivot pivotably couples the proximal end of the linkage rod to the base. The proximal pivot and the cargo pivot define a proximal linkage having a proximal distance therebetween. An electronic device receives an electric current and sends electric signals. A device pivot pivotably couples the electronic device to the frame. A distal pivot pivotably couples the distal end of the linkage rod to the electronic device. The distal pivot and the device pivot define a distal linkage having a distal linkage having a distal distance therebetween. The proximal distance and the distal distance cause pivoting of the electronic device between the general vertical position and the general horizontal position for defining a lower general horizontal position in the electronic device in the general horizontal position and an upper general horizontal position in the electronic device in the general vertical position.

In a more specific example, a proximal arm is coupled to the proximal end of the linkage rod. The proximal pivot pivotably couples the proximal arm to the base.

In a more specific example, a base groove is in the base for defining a proximal distance adjustment in the proximal distance. The proximal distance adjustment defines an angular adjustment in the electronic device in the lower general horizontal position and the upper general horizontal position.

In another embodiment, the electronic device includes a proximity sensor for alerting of the presents of an object.

In another embodiment, the electronic device includes a camera for viewing of an object.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
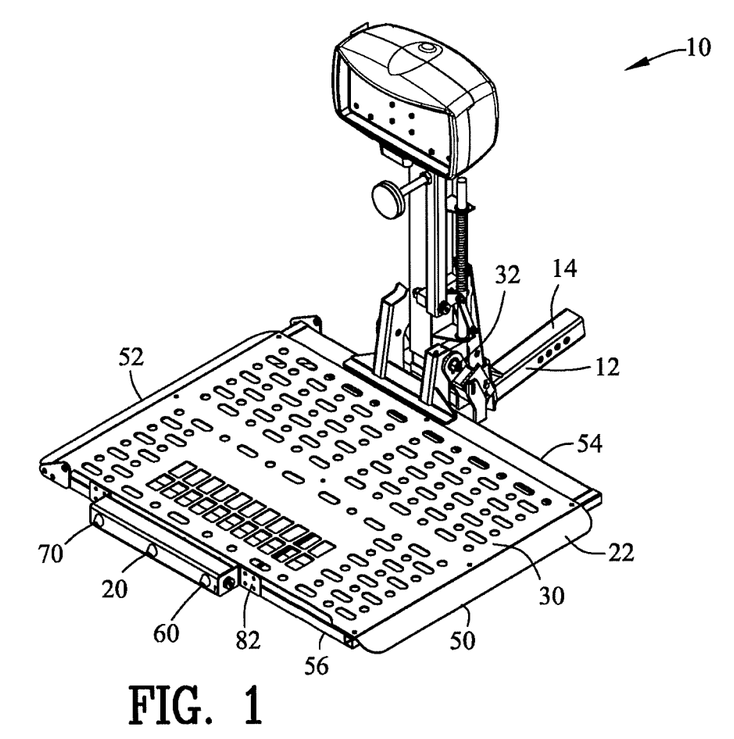
FIG. 1 is a front isometric view of a pivoting system coupled to a folding mobility platform or a cargo platform in a horizontal position.
Figure 2:
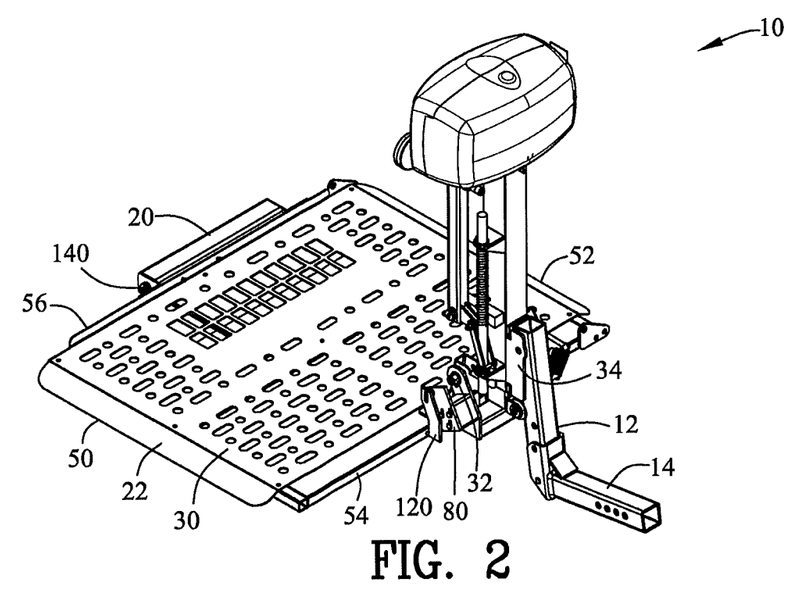
FIG. 2 is a rear isometric view of FIG. 1.
Figure 3:
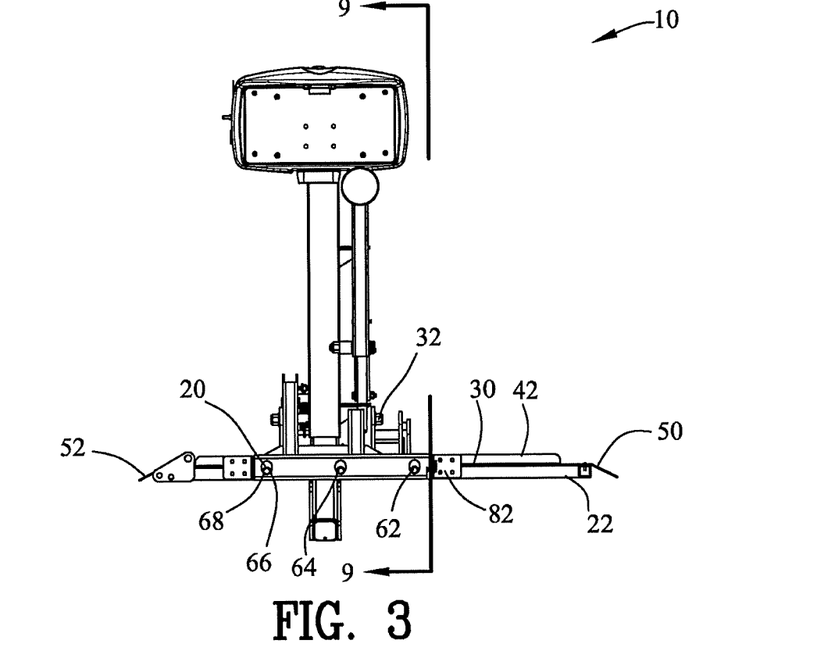
FIG. 3 is a front view of FIG. 1.
Figure 4:
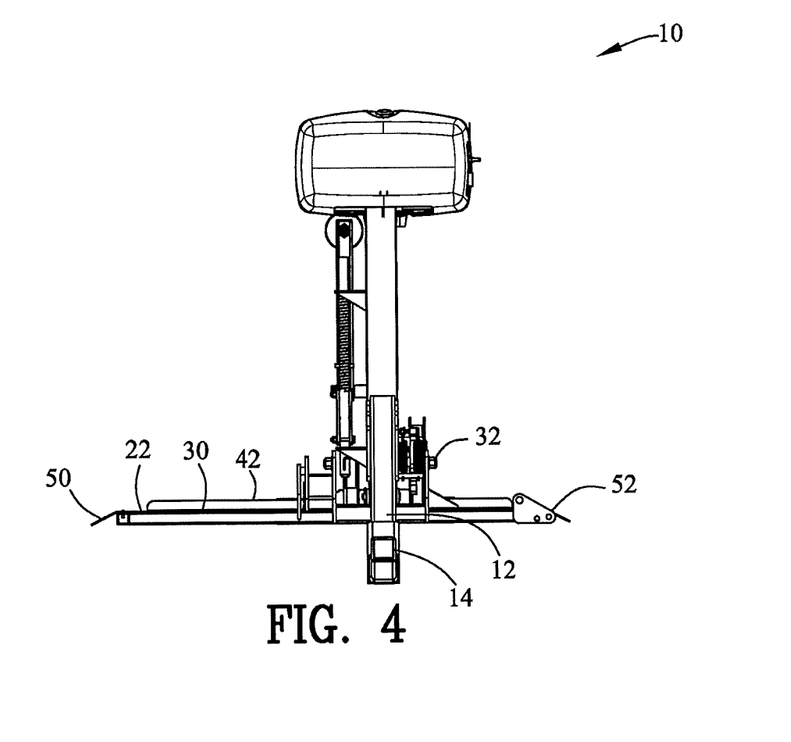
FIG. 4 is a rear view of FIG. 1.
Figure 5:
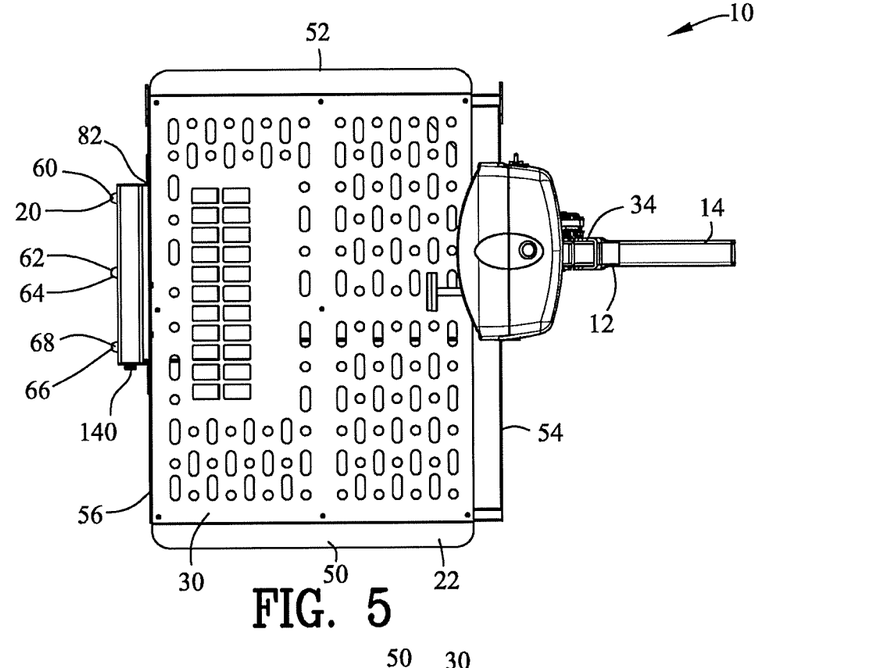
FIG. 5 is a top view of FIG. 1.
Figure 6:
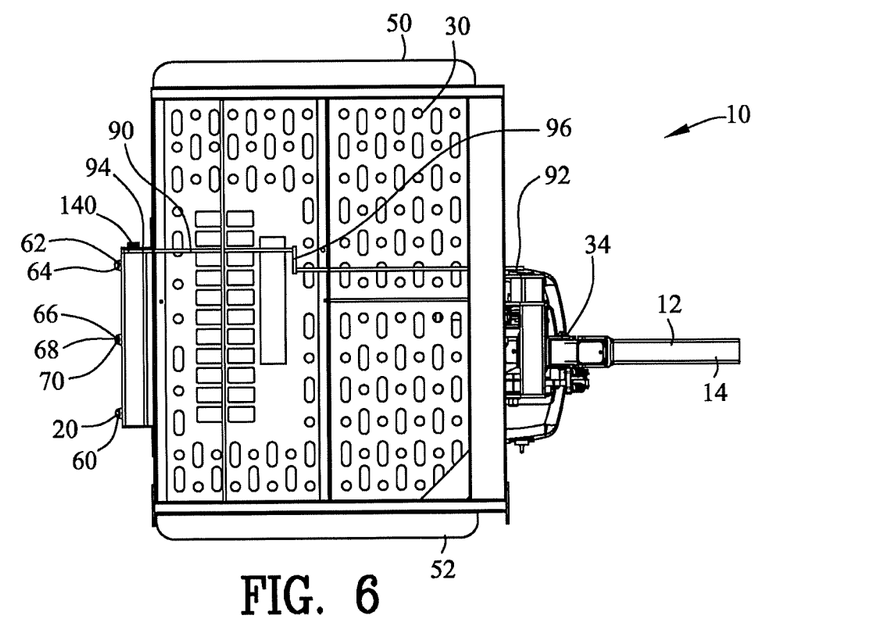
FIG. 6 is a bottom view of FIG. 1.
Figure 7:
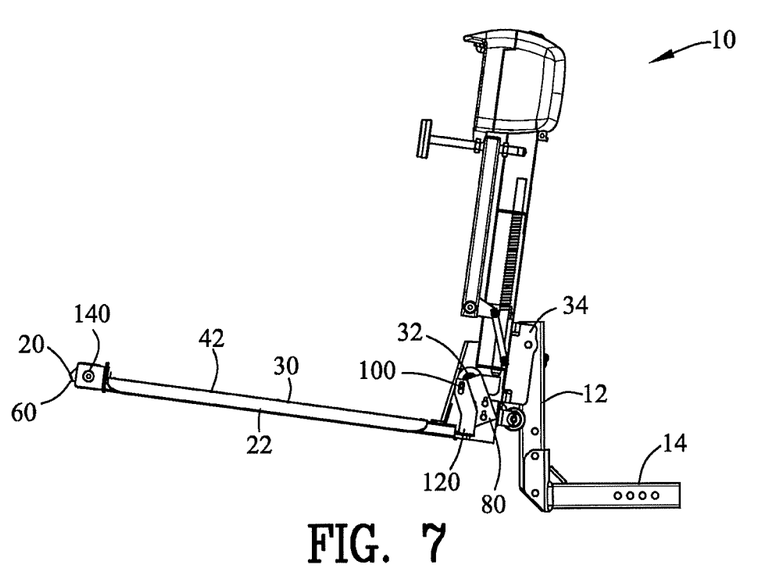
FIG. 7 is a right side view of FIG. 1.
Figure 8:
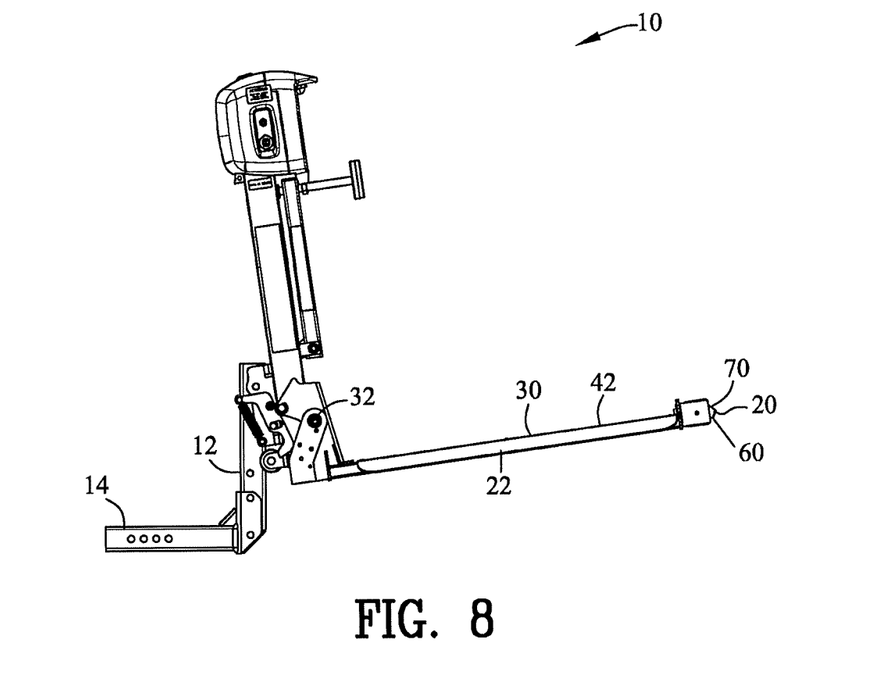
FIG. 8 is a left side view of FIG. 1.
Figure 9:
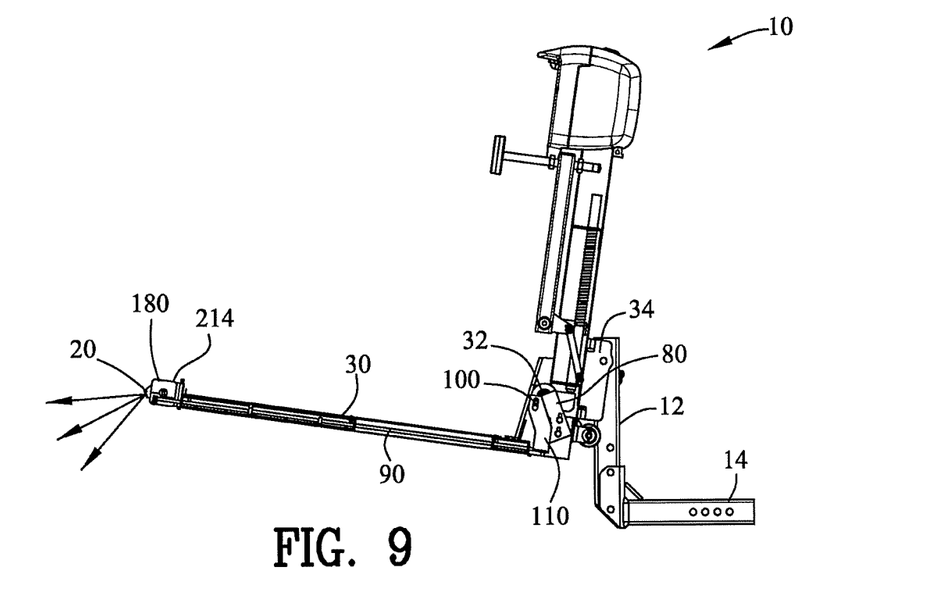
FIG. 9 is a sectional view along line 9-9 in FIG. 3 illustrating a first proximal linkage adjustment setting for the pivoting system in a lower general horizontal position.
Figure 10:
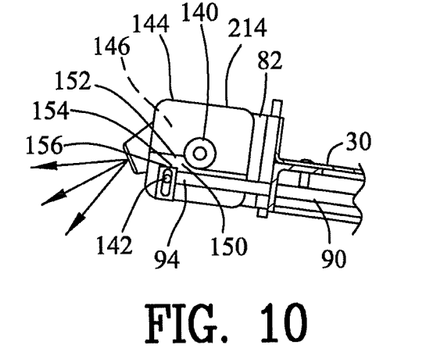
FIG. 10 is an enlarged portion of FIG. 9 illustrating an electronic device coupled with a distal end of a linkage rod.
Figure 11:
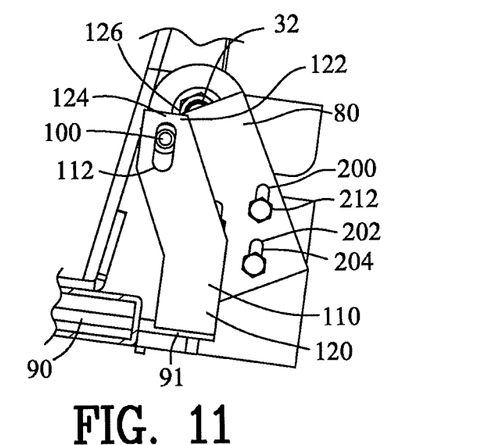
FIG. 11 is an enlarged portion of FIG. 9 illustrating a frame in the first proximal linkage adjustment setting relative to a base.
Figure 12:
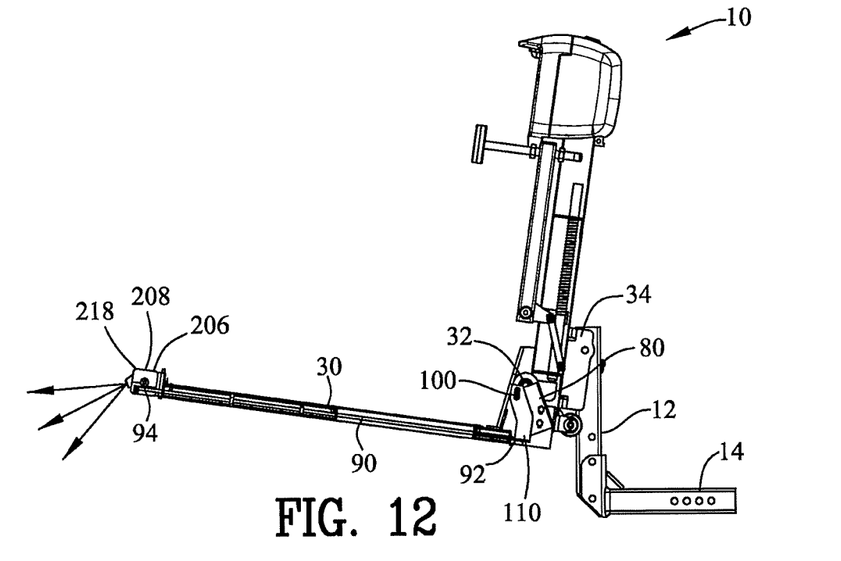
FIG. 12 is a view similar to FIG. 9 illustrating a second proximal linkage adjustment setting for the pivoting system in the lower general horizontal position.
Figure 13:
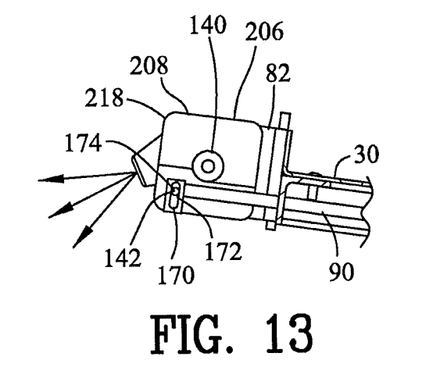
FIG. 13 is an enlarged portion of FIG. 12 illustrating the electronic device coupled with the distal end of the linkage rod.
Figure 14:
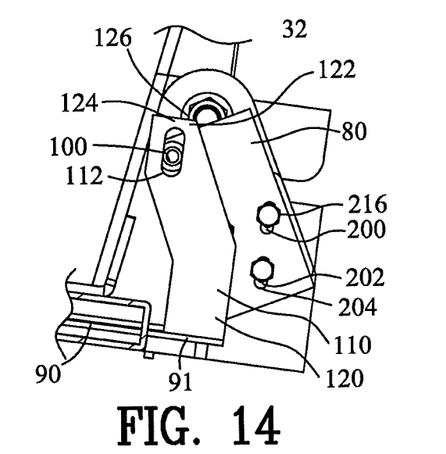
FIG. 14 is an enlarged portion of FIG. 12 illustrating the frame in the second proximal linkage adjustment setting relative to the base.
Figure 15:
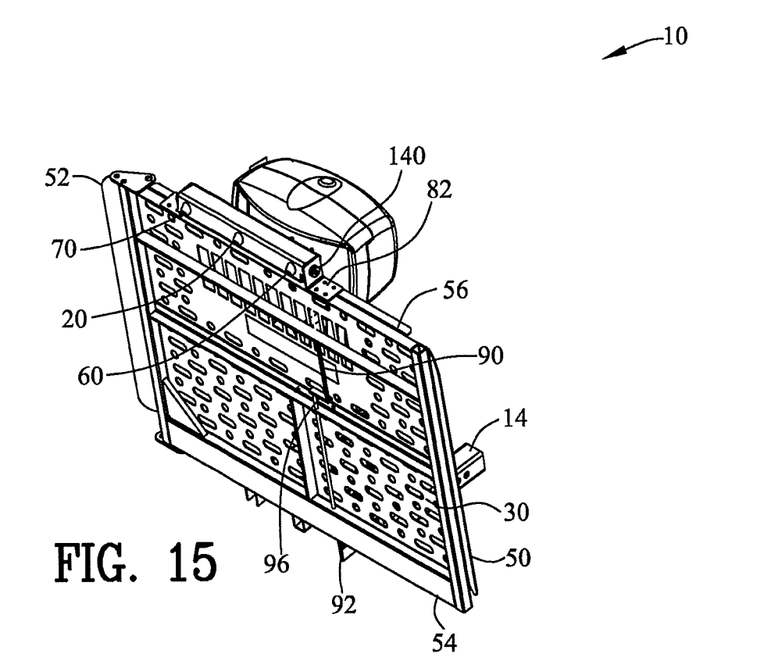
FIG. 15 is a front isometric view of the pivoting system coupled to the folding mobility platform or the cargo platform in a vertical position.
Figure 16:
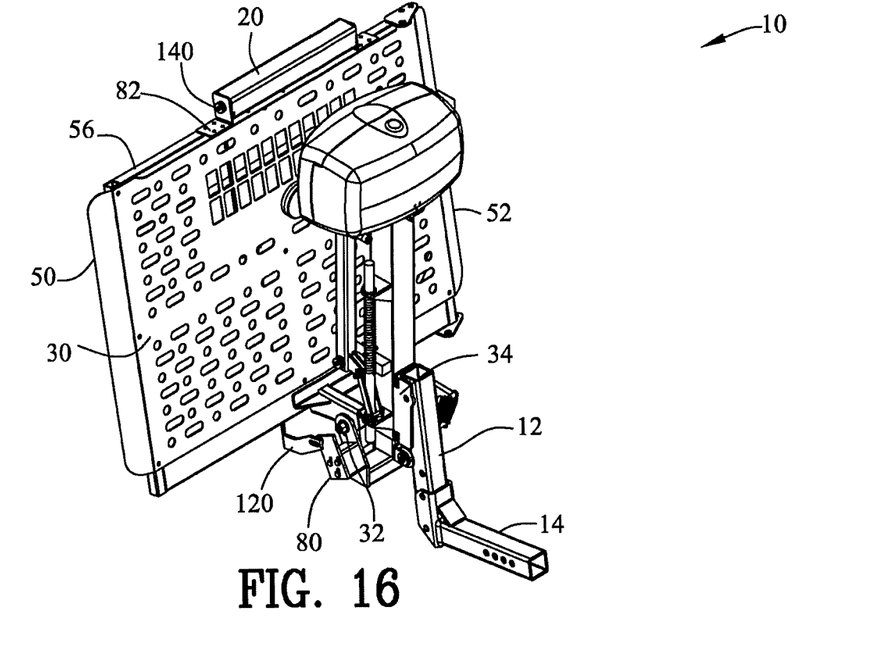
FIG. 16 is a rear isometric view of FIG. 15.
Figure 17:
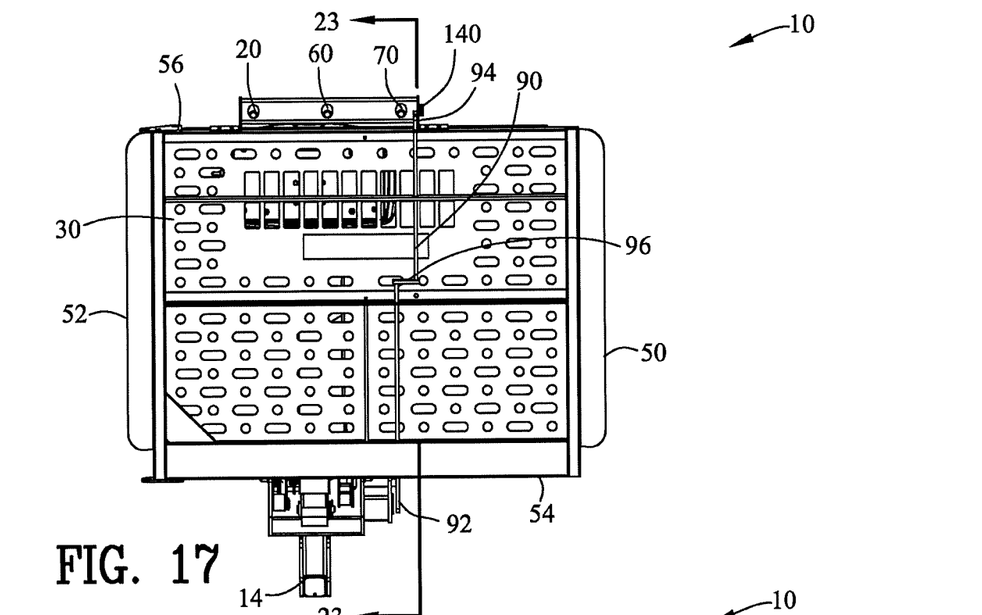
FIG. 17 is a front view of FIG. 15.
Figure 18:
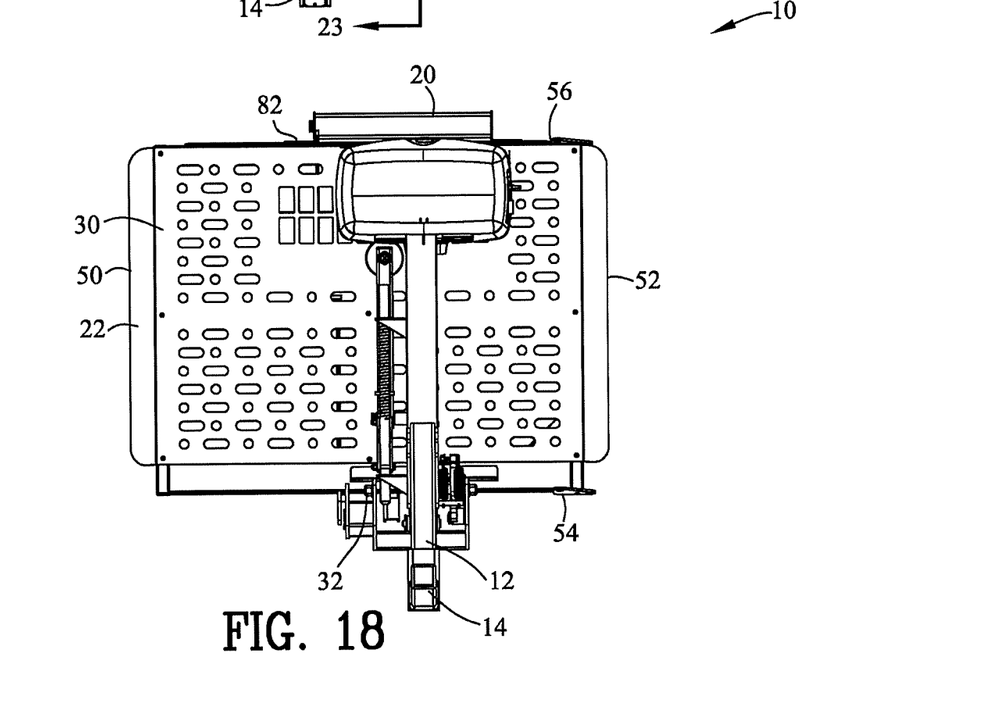
FIG. 18 is a rear view of FIG. 15.
Figure 19:
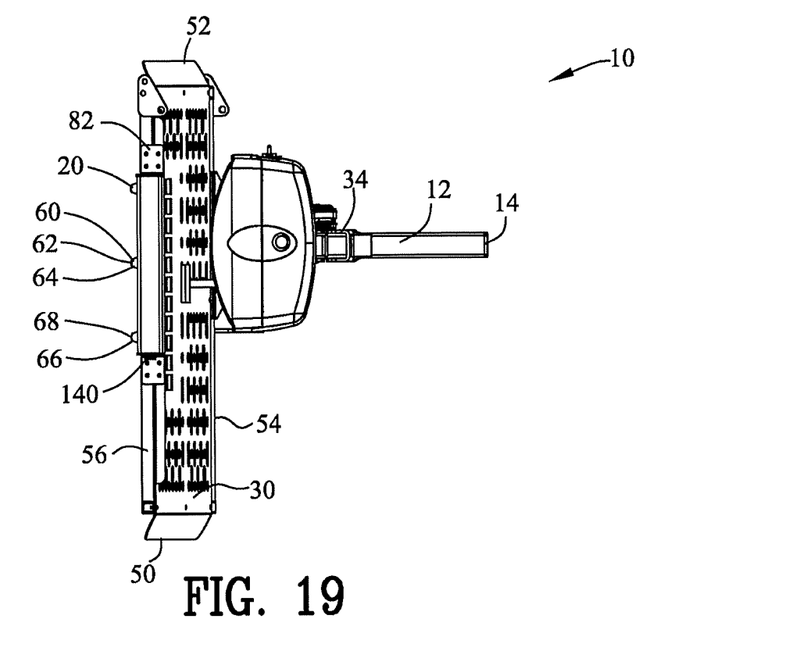
FIG. 19 is a top view of FIG. 15.
Figure 20:
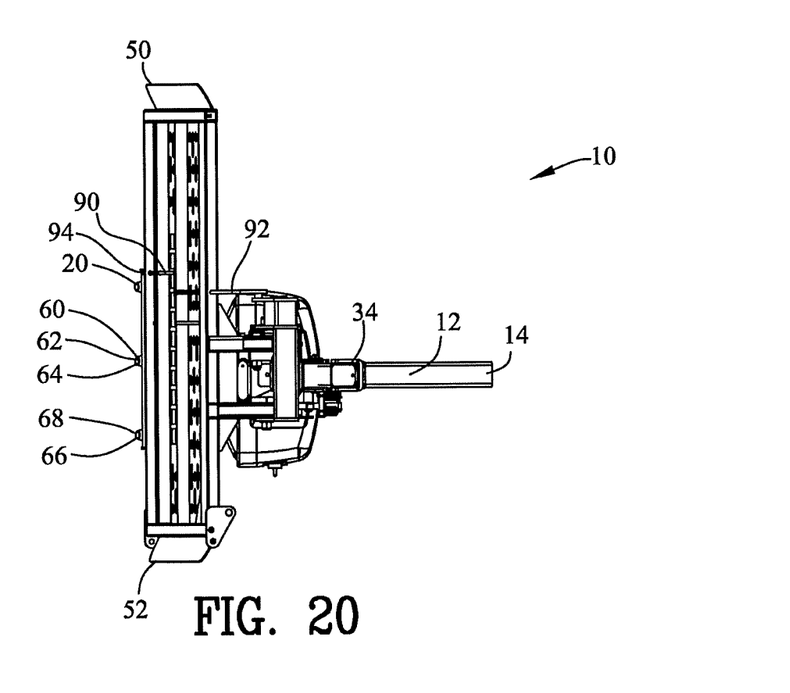
FIG. 20 is a bottom view of FIG. 15.
Figure 21:
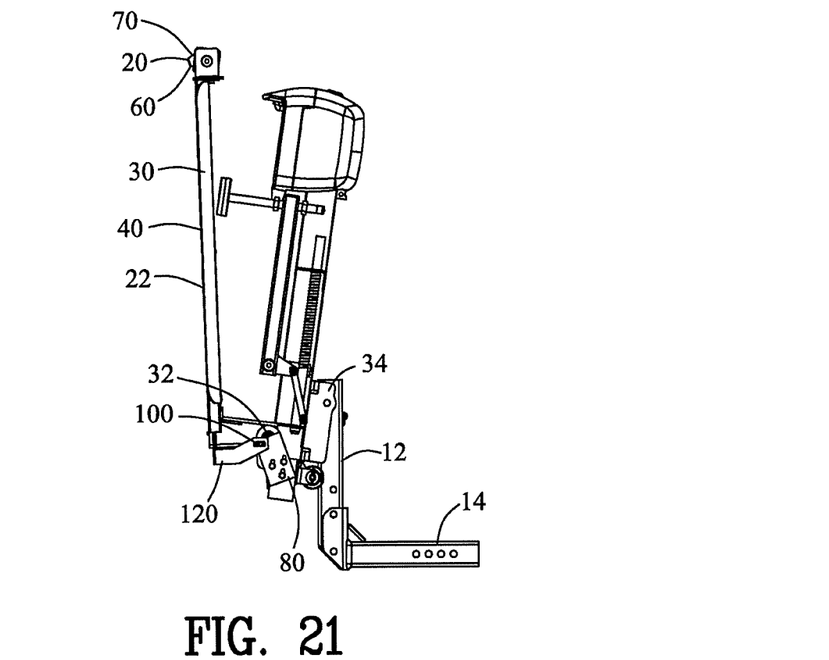
FIG. 21 is a right side view of FIG. 15.
Figure 22:
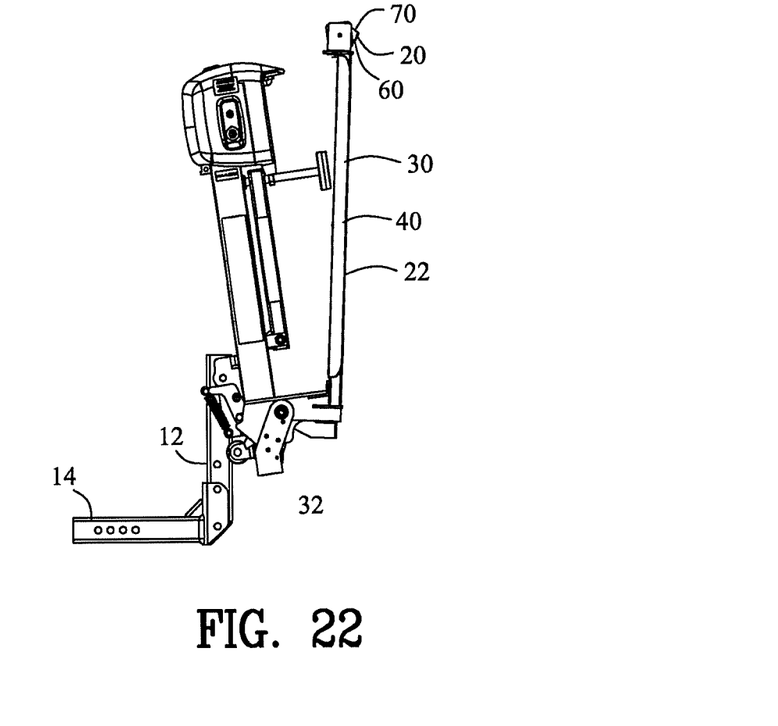
FIG. 22 is a left side view of FIG. 15.
Figures 23, 24:
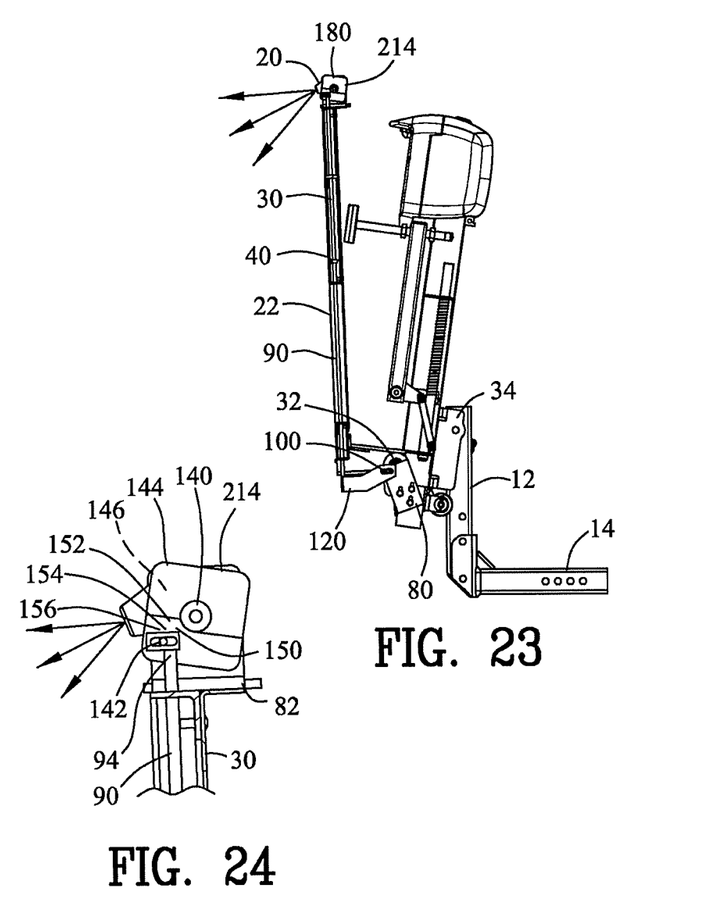
FIG. 23 is a sectional view along line 23-23 in FIG. 17 illustrating the first proximal linkage adjustment setting for the pivoting system in an upper general horizontal position.
FIG. 24 is an enlarged portion of FIG. 23 illustrating the electronic device coupled with the distal end of the linkage rod.
Figure 25:
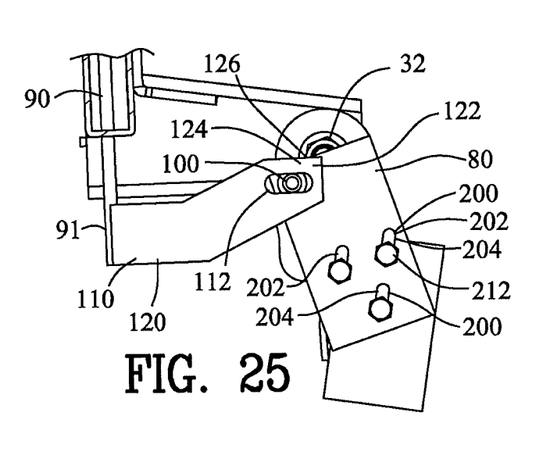
FIG. 25 is an enlarged portion of FIG. 23 illustrating the frame in the first proximal linkage adjustment setting relative to the base.
Figures 26, 27:
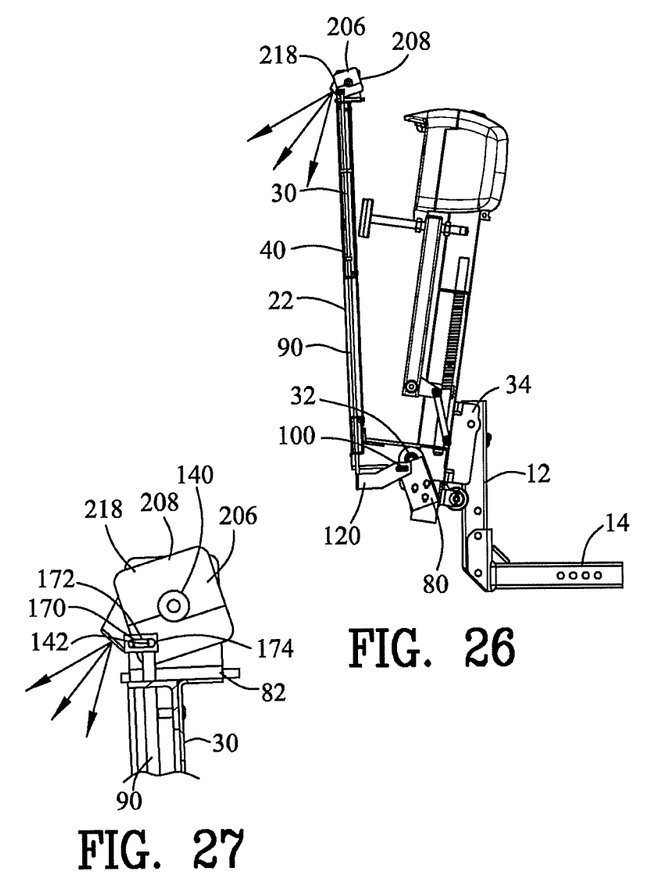
FIG. 26 is a view similar to FIG. 23 illustrating the second proximal linkage adjustment setting for the pivoting system in the upper general horizontal position.
FIG. 27 is an enlarged portion of FIG. 26 illustrating the electronic device coupled with the distal end of the linkage rod.
Figure 28:
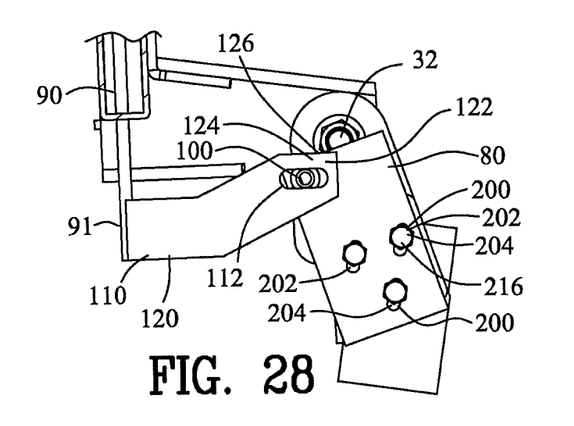
FIG. 28 is an enlarged portion of FIG. 26 illustrating the frame in the second proximal linkage adjustment setting relative to the base.

FIGS. 1-28 are various views of a pivoting system 10 for a device 20 mounted on a cargo platform 30. A cargo pivot 32 pivotably couples the cargo platform 30 with a cargo support 34. The cargo support 34 is coupled to a structure 12. The cargo pivot 32 pivotably couples the cargo platform 30 between a general vertical position 40 as seen in FIGS. 15-28 and a general horizontal position 42 as seen in FIGS. 1-14. The cargo platform 30 has a first side 50, a second side 52 and extends between a proximal end 54 and a distal end 56.

The structure 12 may include a trailer hitch adapter 14 that is coupled to a vehicle (not shown). Alternatively, the structure may include a static mount on a stationary structure. The cargo platform 30 may include a mobility vehicle cargo platform or an external mounted mobility device 22 for transporting a personal mobility device (not shown). The external mounted mobility device 22 facilitates transportation of the personal mobility device when the cargo platform 30 is in the general horizontal position 42. When the personable mobility device is not loaded onto the external mounted mobility device 22, the cargo platform 30 may be positioned into the general vertical position 40.

The pivoting system 10 pivotably couples an electronic device 60 with the cargo platform 32 and pivots the electronic device 60 during pivoting of the cargo platform 30 between the general vertical position 40 and the general horizontal position 42. The electronic device 60 may include a proximity sensor 62, a camera 64, an illumination device 66 and/or a sound emitting device 68. The electronic device 60 receives an electric current 70. The pivoting system 10 may increase effectiveness and improve safety by maintaining the electronic device 60 in a general horizontal position when the cargo platform 30 is positioned anywhere between the general vertical position 40 and the general horizontal position 42.

The pivoting system 10 comprises a base 80 coupled to the cargo support 34. A frame 82 is coupled to the cargo platform 30. Preferably, the frame 82 is coupled to the distal end 56 of the cargo platform 30 such that the electronic device 60 has a higher elevation in the general vertical position 40 and the electronic device 60 is not obstructed by the cargo platform 30 in the general horizontal position 42.

A linkage rod 90 extends between a proximal end 92 and a distal end 94 and slidably engages with the cargo platform 30 relative to the proximal end 54 and the distal end 56 of the cargo platform 30. The linkage rod 90 may further include a perpendicular linkage rod 96 for displacing the proximal end 92 and the distal end 94 of the linkage rod 90 relative to the first side 50 and the second side 52 of the cargo platform 30.

A proximal pivot 100 pivotably couples the proximal end 92 of the linkage rod 90 to the base 80. A proximal arm 110 may be coupled to the proximal end 92 of the linkage rod 90. The proximal pivot 100 pivotably couples the proximal arm 110 to the base 80. A proximal groove 112 is in the proximal arm 110 for slidably engaging the proximal pivot 100 during pivoting of the electronic device 60.

The proximal pivot 100 and the cargo pivot 32 define a proximal linkage 120 having a proximal distance 122 therebetween. More specifically, the proximal pivot 100 and the cargo pivot 32 define proximal vertical distance 124 and a proximal horizontal distance 126 therebetween.

A device pivot 140 pivotably couples the electronic device 60 to the frame 82. A distal pivot 142 pivotably couples the distal end 94 of the linkage rod 90 to the electronic device 60. More specifically, a housing 144 may be pivotably coupled to the frame 82. The housing 144 includes a housing chamber 146 for receive the electronic device 60. The housing 144 protects the electronic device 60 from damage from foreign or outside objects. The distal pivot 142 may pivotably couple the distal end 94 of the linkage rod 90 to the housing 142.

The distal pivot 142 and the device pivot 140 define a distal linkage 150 having a distal distance 152 therebetween. More specifically, the distal pivot 142 and the device pivot 140 define a distal vertical distance 154 and a distal horizontal distance 156 therebetween.

A distal groove 170 may be positioned in the electronic device 60 for slidably engaging the device pivot 140 during pivoting of the electronic device 60. Alternatively, the distal groove 170 may be positioned in the housing 144 for slidably engaging the device pivot 140 during pivoting of the electronic device 60. More specifically, a channel body 172 may be coupled to the distal end 94 of the linkage rod 90. The channel body 172 defining a distal groove 170. A coupling pin 174 traverses the distal groove 170 and couples the housing 144 to the linkage rod 90. The coupling pin 174 slidably engages the distal groove 170 during pivoting of the electronic device 60.

The proximal distance 122 and the distal distance 152 cause pivoting of the electronic device 60 between the general vertical position 40 and the general horizontal position 42 for defining a lower general horizontal position 180 in the electronic device 60 in the general horizontal position 42 and an upper general horizontal position 182 in the electronic device 60 in the general vertical position 40.

Furthermore, the proximal pivot 100, the distal pivot 142 and the device pivot 140 causes pivoting of the electronic device 60 between the general vertical position 40 and the general horizontal position 42 for defining the lower general horizontal position 180 in the electronic device 60 in the general horizontal position 42 and the upper general horizontal position 182 in the electronic device 60 in the general vertical position 40.

The base 80 may include a base groove 200. The base groove 200 defines a proximal linkage adjustment 202 having a proximal distance adjustment 204 in the proximal distance 122. The proximal distance adjustment 204 defines an angular adjustment 206 in the electronic device 60 in the lower general horizontal position 180 and the upper general horizontal position 182. More specifically, the base 80 includes a vertical base groove 210 for changing the proximal vertical distance 124 of the proximal pivot 100 relative to the cargo pivot 34 for defining a proximal linkage adjustment 202 having a proximal distance adjustment 204. The proximal distance adjustment 204 defines an angular adjustment 206 for alternating the angular orientation 208 of the electronic device 60 in the lower general horizontal position 180 and the upper general horizontal position 182.

As best shown in FIGS. 9-11 and 23-25, a first proximal linkage adjustment 212 results in the electronic device 60 having a general level orientation 214 when the cargo platform 30 is positioned within the general vertical position 40. Alternatively, as best shown in FIGS. 12-14 and 26-28, a second proximal linkage adjustment 216 results in the electronic device 60 having a general descending position 218. The proximal linkage adjustment 202 may be beneficial by adjusting the angular orientation of the electronic device 60 for increasing the performance of the electronic device 60. Furthermore, the proximal linkage adjustment 202 may be beneficial for utilizing the pivoting system 10 on various cargo platforms 30 having different sizes. For example the larger the cargo platform 30 the more the electronic device 60 needs to be adjusted towards the ground so that the field of view is in the proper position. It should be noted, that the proximal linkage adjustment 202 primarily adjusts the angle of the electronic device 60 in the top position as shown in FIGS. 23, 24, 26 and 27 and does little to adjust the electronic device 60 in the lower position as shown in FIGS. 9, 10, 12 and 13.

The present invention further incorporates a method for pivoting a device 20 mounted on a cargo platform 30. A cargo pivot 32 pivotably couples the cargo platform 30 with a cargo support 34. The cargo support 34 is coupled to a structure 12. The cargo pivot 32 pivotably couples the cargo platform 30 between a general vertical position 40 and a general horizontal position 42. The method comprises the steps of coupling a frame 82 to the cargo platform 30. An electronic device 60 is coupled to the frame 82 for receiving an electric current 70 and sending electric signals 70. The electronic device 60 pivots relative to the frame 82 for causing pivoting of the electronic device 60 relative to the frame 82 between the general vertical position 40 and the general horizontal position 42 for defining a lower general horizontal position 180 in the electronic device 60 in the general horizontal position 42 and an upper general horizontal position 182 in the electronic device 60 in the general vertical position 40.

The electronic device 60 may be pivoted relative to the frame 82 by a mechanical linkage 90. Alternatively, the electronic device 60 may be pivoted relative to the frame 82 by an electronic inclinometer that is electrically coupled to a motor that pivots the electronic device 60.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed:

1. A pivoting system for a device mounted on a cargo platform, a cargo pivot pivotably coupling the cargo platform with a cargo support, the cargo support coupled to a structure, the cargo pivot pivotably coupling the cargo platform between a general vertical position and a general horizontal position, the pivoting system, comprising:
   a frame coupled to the cargo platform;
   an electronic device for receiving an electric current and sending electric signals;
   a device pivot pivotably coupling the electronic device to the frame; and
   a linkage extending from a proximal end of the cargo platform to a distal pivot of the electronic device, wherein the linkage slidably engages the electronic device to allow the electronic device to pivot relative to the frame between a lower general horizontal position when the cargo platform is in the general horizontal position and an upper general horizontal position when the cargo platform is in the general vertical position.

2. The pivoting system of claim 1, wherein the frame is coupled to a distal end of the cargo platform such that the electronic device has a higher elevation in the general vertical position, and wherein the electronic device is not obstructed by the cargo platform in the general horizontal position.

3. The pivoting system of claim 1, wherein the electronic device is configured to remain in a general horizontal position when the cargo platform is positioned at any position between the general vertical position and the general horizontal position.

4. The pivoting system of claim 1 further including a housing pivotably coupled to the frame.

5. The pivoting system of claim 4, wherein the housing includes a housing chamber configured to receive the electronic device, and wherein the housing protects the electronic device from damage.

6. The pivoting system of claim 1, wherein the cargo platform is a mobility vehicle cargo platform.

7. The pivoting system of claim 6 further including a trailer hitch adapter coupled to the structure, wherein the trailer hitch adapter is configured to couple to a vehicle.

8. The pivoting system of claim 1, wherein the electronic device includes a sound emitting device.

9. The pivoting system of claim 1, wherein the electronic device includes a proximity sensor for alerting of a presence of an object.

10. The pivoting system of claim 1, wherein the electronic device includes a camera for viewing of an object.

11. The pivoting system of claim 1, wherein the linkage slidably engages a distal groove on the electronic device.

12. A method for pivoting a device comprising:
   pivotably coupling a cargo pivot to a cargo platform with a cargo support, wherein the cargo support is coupled to a structure, and wherein the cargo platform is configured to pivot between a general vertical position and a general horizontal position;
   coupling a frame to the cargo platform;
   coupling an electronic device to the frame, wherein the electronic device is configured for receiving an electric current and sending electric signals;
   extending a linkage from a proximal end of the cargo platform to a distal pivot of the electronic device, wherein the linkage slidably engages the electronic device;
   pivoting the electronic device relative to the frame between a lower general horizontal position when the cargo platform is in the general horizontal position and an upper general horizontal position when the cargo platform is in the general vertical position.

13. The method of claim 12, wherein the frame is coupled to a distal end of the cargo platform such that the electronic device has a higher elevation in the general vertical position, and wherein the electronic device is not obstructed by the cargo platform in the general horizontal position.

14. The method of claim 12, wherein the electronic device is configured to remain in a general horizontal position when the cargo platform is positioned at any position between the general vertical position and the general horizontal position.

15. The method of claim 12, wherein the method further includes a housing pivotably coupled to the frame.

16. The method of claim 15, wherein the housing includes a housing chamber configured to receive the electronic device, and wherein the housing protects the electronic device from damage.

17. The method of claim 12, wherein the cargo platform is a mobility vehicle cargo platform.

18. The method of claim 17 further including a trailer hitch adapter coupled to the structure, wherein the trailer hitch adapter is configured to couple to a vehicle.

19. The method of claim 12, wherein the electronic device includes a proximity sensor for alerting of a presence of an object.

20. The method of claim 12, wherein the electronic device includes a camera for viewing of an object.

* * * * *